United States Patent Office 2,810,757
Patented Oct. 22, 1957

2,810,757
PREPARATION OF OCTAALKYLPYROPHOSPHORAMIDES

William M. Lanham, Charleston, and Percy L. Smith, Dunbar, W. Va., assignors to Union Carbide Corporation, a corporation of New York No Drawing. Application November 17, 1954, Serial No. 469,559

4 Claims. (Cl. 260—545)

This invention relates to a novel process for the production of octaalkylpyrophosphoramides having the general structure

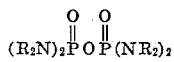

wherein each R represents an alkyl group having from 1 to 4 carbon atoms.

Such compounds are known systemic insecticides. Those compounds of the aforesaid formula wherein each R is a methyl group displays a valuable selective action on insects, being highly toxic to aphids and relatively nonpoisonous to beneficial insects. (Nature, vol. 163, p. 787 (1949).)

According to the present invention these compounds are made by reacting a tetraalkyldiamidochlorophosphate with an alkali metal carbonate, in accordance with the equation

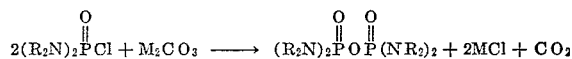

wherein R is an alkyl group having 1 to 4 carbon atoms; and M is an alkali metal such as sodium, potassium or lithium.

While the reaction involved requires the use of one mol of the alkali metal carbonate for each two mols of the tetraalkyldiamidochlorophosphate, it is preferred to employ an excess of the carbonate up to a 100% molar excess thereof to insure a rapid and complete reaction.

The reaction can conveniently be conducted in the presence of an inert solvent for the phosphorus-containing reactant, but the use of such a solvent is not essential. Suitable solvents include high boiling hydrocarbon ethers such as dibutyl ether, dihexyl ether, and dioctyl ether, paraffin hydrocarbons such as octane and nonane, benzenoid hydrocarbons such as toluene and the xylenes, and chlorinated hydrocarbons such as hexyl chloride, octyl chloride, and propylene dichloride.

While reaction temperatures in the range of 80° C. to around 125° C. are sufficient to complete the reaction in a reasonably short time without effecting substantial side reactions, temperatures within the range of 50° C. to 250° C. can be employed.

The use of anhydrous alkali metal carbonates is essential if maximum yields of the octaalkylpyrophosphoramides are sought, thereby avoiding the formation of acidic by-products due to hydrolysis in the course of the main reaction. Otherwise an inferior grade of alkali metal carbonate (e. g. soda ash) can be used.

In instances where the reaction is conducted in the absence of any inert solvent it is advantageous to add the alkali metal carbonate to the agitated tetraalkyldiamidochlorophosphate maintained at around 100° C. The same result can be secured by adding the latter dropwise to a heated suspension of an alkali metal carbonate in a liquid inert to the reactants, or by intimately mixing the two reactants together at 25° C. and then heating the mixture to around 100° C.

Carbon dioxide is evolved continuously throughout the reaction. Thus, when carbon dioxide evolution ceases, the reaction is complete. The reaction mixture then is filtered, with or without the use of a filter aid; and the filtrate is stripped by fractional distillation in vacuum if a solvent was used during the preparation. The residual octaalkylpyrophosphoramide is recovered in the form of an almost colorless liquid soluble in ethyl ether and benzene.

The tetraalkyldiamidochlorophosphates used as starting materials in this process can be made by reacting a dialkylamine and phosphoryl chloride by the method described in J. Chem. Soc., 1950, pp. 1769–1772.

The following examples serve to illustrate the invention.

Example 1

To 85 grams (0.5 mol) of tetramethyldiamidochlorophosphate there were added during 15 minutes with agitation thereof 53 grams (0.5 mol) of anhydrous sodium carbonate in small successive portions, while heating the mixture to maintain it at 100° C. during the addition and for an additional eight hours. During this time carbon dioxide was slowly evolved. To the resultant reaction mixture were added 10 grams of a diatomaceous earth filter aid and 50 cc. of ethyl ether, and the diluted reaction mixture was filtered. The filtrate therefrom was stripped by fractional distillation to a kettle temperature of 50° C. under a pressure of less than 2 mm. of mercury, yielding 63.5 grams (theory=71.5 grams) of octamethylpyrophosphoramide in the form of an almost colorless liquid residue having the following properties: $n_D^{30}$= 1.4598; percent Cl=nil; acidity=0.008 cc. of a 1 Normal NaOH solution per gram.

A 59.5 gram portion of this liquid residue was purified by distillation at 100° C. under a pressure of less than 0.2 mm. of mercury, using a falling film type still, and 45.5 grams of a colorless fluid distillate was obtained having the following properties: $n_D^{30}$=1.4597; acidity=0.006 cc. of a 1 Normal NaOH solution per gram; percent P, by weight=22.53 (theory=21.64); percent Cl=nil; molecular weight (by modified Menzies-Wright determination)= 289.3 (theory=282.3). This compound has the following structure:

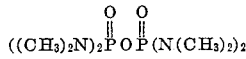

Example 2

To 120 grams (0.703 mol) of tetramethyldiamidochlorophosphate there were added in small successive amounts during 15 minutes 40 grams (0.377 mol) of anhydrous sodium carbonate, with agitation of the mixture. Heat was applied to the reaction mixture throughout the addition and for 15 hours thereafter to maintain the mixture at 100° C. Carbon dioxide was slowly but continuously evolved. Thereafter there were added to the reaction mixture, at 25° C., 50 cc. of ethyl ether and 16 grams of a diatomaceous earth filter aid. The diluted reaction mixture was filtered, and the filtrate was stripped by vacuum distillation to a kettle temperature of 50° C. under 2 mm. of mercury pressure. An 83 gram portion of the liquid residue from the distillation was distilled under vacuum, using a modified Claisen-type still. There was thus obtained a 20 gram fraction of octamethylpyrophosphoramide in the form of a colorless liquid boiling at about 155° C. under 2.5 mm. of mercury pressure, and having the following properties: percent P, by weight= 22.45 (theory=21.64); percent Cl=nil; $n_D^{30}$=1.4603.

Similarly octaethylpyrophosphoramide can be made by reacting tetraethyldiamidochlorophosphate and anhydrous sodium carbonate; and octabutylpyrophosphoramide can be made by reacting tetrabutyldiamidochlorophosphate and anhydrous sodium carbonate in the manner described.

The invention is susceptible of modification within the scope of the appended claims.

We claim:

1. Process for making an octaalkylpyrophosphoramide having one to four carbon atoms in each alkyl group, which comprises reacting a tetraalkyldiamidochlorophosphate with an anhydrous alkali metal carbonate in a molar ratio of more than 0.5 mol of the alkali metal carbonate per mol of the said chlorophosphate, at temperatures within the range from about 50° C. to about 125° C., and recovering from the resultant reaction mixture the octaalkylpyrophosphoramide thereby produced.

2. Process for making an octaalkylpyrophosphoramide having one to four carbon atoms in each alkyl group, which comprises reacting a tetraalkyldiamidochlorophosphate with an anhydrous alkali metal carbonate, at temperatures within the range from about 50° C. to about 125° C., using more than 0.5 mol and up to around 2 mols of the carbonate per mol of the said tetraalkyldiamidochlorophosphate, and recovering from the resultant reaction mixture the octaalkylpyrophosphoramide thereby produced.

3. Process as defined in claim 1 wherein the alkali metal carbonate is anhydrous sodium carbonate.

4. Process for making an octamethylpyrophosphoramide, which comprises reacting a tetramethyldiamidochlorophosphate with an anhydrous alkali metal carbonate in a molar ratio of more than 0.5 mol and up to around 1 mol of the alkali metal carbonate per mol of the said chlorophosphate, at temperatures within the range from around 80° C. to around 125° C., and recovering from the resultant reaction mixture the octamethylpyrophosphoramide thereby produced.

References Cited in the file of this patent

UNITED STATES PATENTS

| 2,671,109 | Hartley et al. | Mar. 2, 1954 |
| 2,706,738 | Toy et al. | Apr. 19, 1955 |

FOREIGN PATENTS

| 1,056,773 | France | Mar. 2, 1954 |

OTHER REFERENCES

P. B. 95312 (BIOS Report 1808) Dec. 1947, pp. 16 and 17.